United States Patent
Shin et al.

(10) Patent No.: US 9,238,459 B2
(45) Date of Patent: Jan. 19, 2016

(54) BATTERY CHARGING METHOD FOR HYBRID ELECTRIC VEHICLES

(71) Applicants: Hyundai Motor Company, Seoul (KR); Kia Motors Corporation, Seoul (KR)

(72) Inventors: Gwang Seob Shin, Ansan-si (KR); Yeon Ho Kim, Suwon-si (KR)

(73) Assignees: Hyundai Motor Company, Seoul (KR); Kia Motor Corporation, Seoul (KR)

( * ) Notice: Subject to any disclaimer, the term of this patent is extended or adjusted under 35 U.S.C. 154(b) by 505 days.

(21) Appl. No.: 13/660,641

(22) Filed: Oct. 25, 2012

(65) Prior Publication Data

US 2013/0154576 A1 Jun. 20, 2013

(30) Foreign Application Priority Data

Dec. 14, 2011 (KR) .................. 10-2011-0134913

(51) Int. Cl.
| | | |
|---|---|---|
| *H02J 7/04* | (2006.01) | |
| *B60L 9/00* | (2006.01) | |
| *G06F 7/00* | (2006.01) | |
| *H02J 7/14* | (2006.01) | |
| *B60W 20/00* | (2006.01) | |
| *B60K 6/48* | (2007.10) | |
| *B60K 6/547* | (2007.10) | |
| *B60W 10/26* | (2006.01) | |
| *B60W 10/02* | (2006.01) | |

(Continued)

(52) U.S. Cl.
CPC .............. *B60W 20/106* (2013.01); *B60K 6/48* (2013.01); *B60K 6/547* (2013.01); *B60W 10/02* (2013.01); *B60W 10/06* (2013.01); *B60W 10/08* (2013.01); *B60W 10/11* (2013.01); *B60W 10/26* (2013.01); *B60W 20/00* (2013.01); *B60W 30/18054* (2013.01); *B60L 11/18* (2013.01); *B60W 2510/101* (2013.01); *B60W 2510/244* (2013.01); *B60W 2520/04* (2013.01); *B60W 2540/12* (2013.01); *B60W 2550/142* (2013.01); *B60W 2710/244* (2013.01); *Y02T 10/6221* (2013.01); *Y02T 10/6286* (2013.01); *Y02T 10/7005* (2013.01)

(58) Field of Classification Search
CPC .......................... B60W 20/106; B60W 20/104
USPC ................... 180/65.256; 701/22, 54
See application file for complete search history.

(56) References Cited

U.S. PATENT DOCUMENTS

| | | | | |
|---|---|---|---|---|
| 4,618,041 A | * | 10/1986 | Sotoyama et al. | .... F16H 61/143 477/61 |
| 5,722,911 A | * | 3/1998 | Ibaraki et al. | ..................... 477/3 |

(Continued)

FOREIGN PATENT DOCUMENTS

| | | |
|---|---|---|
| JP | 2006312455 A | 11/2006 |
| JP | 2008247252 A | 10/2008 |

(Continued)

*Primary Examiner* — M'Baye Diao
(74) *Attorney, Agent, or Firm* — Morgan, Lewis & Bockius LLP

(57) ABSTRACT

A battery charging method for a hybrid electric vehicle, may include a step of receiving a vehicle gradient value through a transmission control unit (TCU) or an inclination sensor when the vehicle stops, a step of converting a transmission stage into an N stage and driving an engine to recharge a battery by a main motor when the received vehicle gradient value a preset gradient value or less, and a step of charging the battery by Generating the main motor by engaging an engine clutch after the engine driven.

4 Claims, 4 Drawing Sheets

(51) Int. Cl.
*B60W 10/06* (2006.01)
*B60W 10/11* (2012.01)
*B60W 30/18* (2012.01)
*B60W 10/08* (2006.01)
B60L 11/18 (2006.01)

(56) References Cited

U.S. PATENT DOCUMENTS 5,806,617 A * 9/1998 Yamaguchi .............. 180/65.235
5,903,061 A * 5/1999 Tsuzuki et al. ............. 290/40 C
8,700,278 B2 * 4/2014 Waku et al. .................... 701/54

2010/0259219 A1    10/2010  Kurimoto et al.
2010/0332062 A1 * 12/2010  Goto et al. ...................... 701/22
2012/0245779 A1     9/2012  Goto et al.

FOREIGN PATENT DOCUMENTS

| KR | 1998-027467 A | 7/1998 |
| KR | 10-2010-0011959 A | 2/2010 |
| KR | 10-2010-0021662 A | 2/2010 |
| KR | 1020100021662 | 2/2010 |
| KR | 20100087383 A | 8/2010 |

* cited by examiner

BATTERY CHARGING METHOD FOR HYBRID ELECTRIC VEHICLES

CROSS-REFERENCE TO RELATED APPLICATION

The present application claims priority to Korean Patent Application No. 10-2011-0134913, filed on Dec. 14, 2011 in the Korean Intellectual Property Office, the entire contents of which is incorporated herein for all purposes by this reference.

BACKGROUND OF THE INVENTION

1. Field of the invention

The present invention relates to a battery charging method for hybrid electric vehicles capable of supplementing battery by charging a main motor when the hybrid electric vehicles stop.

2. Description of Related Art

A hybrid electric vehicle (HEV) is generally configured to transfer power to wheels through a continuously variable transmission (CVT) in a form in which an electric throttle control (ETC) is added to an engine and an electric motor is directly connected thereto.

The hybrid electric vehicle is controlled to correspond to traveling conditions so as to make fuel efficiency of the engine highest. Meanwhile, the hybrid electric vehicle is transferred with inertial energy of a vehicle through wheels at the time of braking and deceleration and converts the inertial energy into electric energy through a motor so as to recharge a battery, thereby achieving fuel efficiency higher than that of the existing gasoline engine.

As described above, when charging the battery of the hybrid electric vehicle, there are no cases in which conditions of vehicle speed, deceleration demands, and the like, are instantly same, and as a result, the battery may not be recharged with constant voltage. Further, even when the charging state of the battery is low, generation efficiency needs to be maximized and thus, the charging of the battery with constant voltage applied only in a special case.

Meanwhile, in the case of the existing parallel type hybrid electric vehicle, the battery recharged by a main motor only during the traveling when the remaining capacity of the battery is insufficient and recharged with a small amount by a hybrid starter generator (HSG) rather than by the main motor when the vehicle stops.

That is, as shown in FIG. 1, in the case of the existing parallel type hybrid vehicle, the engine stops when the vehicle stops and the vehicle waits in a state in which an engine clutch is separated. Thereafter, when the vehicle starts again, the engine is ignited and driven. In this case, the battery is recharged by the HSG and the driving RPM of the motor synchronizes with the RPM of the engine and then, the engine clutch is locked and the motor starts.

However, the driving conditions may be variable and therefore, the case in which the remaining capacity of the battery is insignificant may always occur in the hybrid vehicle. In this condition, when the vehicle stops at a drive stage (D stage) as in the past, the charging amount of the battery by the HSG is limited and thus, the battery cannot be fully recharged. The phenomenon hinders the sufficient use of the motor at the time of traveling, which leads to the reduction in the drivability of a vehicle and the fuel efficiency.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a battery charging method for a hybrid electric vehicle capable of implementing efficient driving and improving fuel efficiency by supplementing a battery by charging a main motor when a hybrid electric vehicle stops.

In an aspect of the present invention, a battery charging method for a hybrid electric vehicle, may include a step of receiving a vehicle gradient value through a transmission control unit (TCU) or an inclination sensor when the vehicle stops, a step of converting a transmission stage into an a neutral stage (N stage) and driving an engine to recharge a battery by a main motor when the received vehicle gradient value is a preset gradient value or less, and a step of charging battery by Generating the main motor by engaging an engine clutch after the engine is driven.

At the step of charging of the main motor by engaging the engine clutch after the engine is driven, when the brake is released to restart the vehicle, changing the transmission stage from the N stage to a D stage by slipping an under drive (UD) clutch in a transmission such that the vehicle goes forward.

The preset gradient value is determined within a range of a gradient value in which energy required when the vehicle starts is smaller than allowable energy at the time of an UD clutch slip by comparing energy required when the vehicle starts at the corresponding gradient value with the allowable energy at the time of the UD clutch slip.

The steps are progressed when there is a need to improve a remaining capacity of the battery by confirming whether there is a need to improve the remaining capacity of the battery.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings.

A gradient when a hybrid vehicle stops may be approximately predicted by a transmission control unit (TCU) (or inclination sensor). The exemplary embodiment of the present invention uses the inclination value to recharge a main motor even when a vehicle stops at a D stage in the case of the low inclination (for example, 4% or less).

Figure 1:
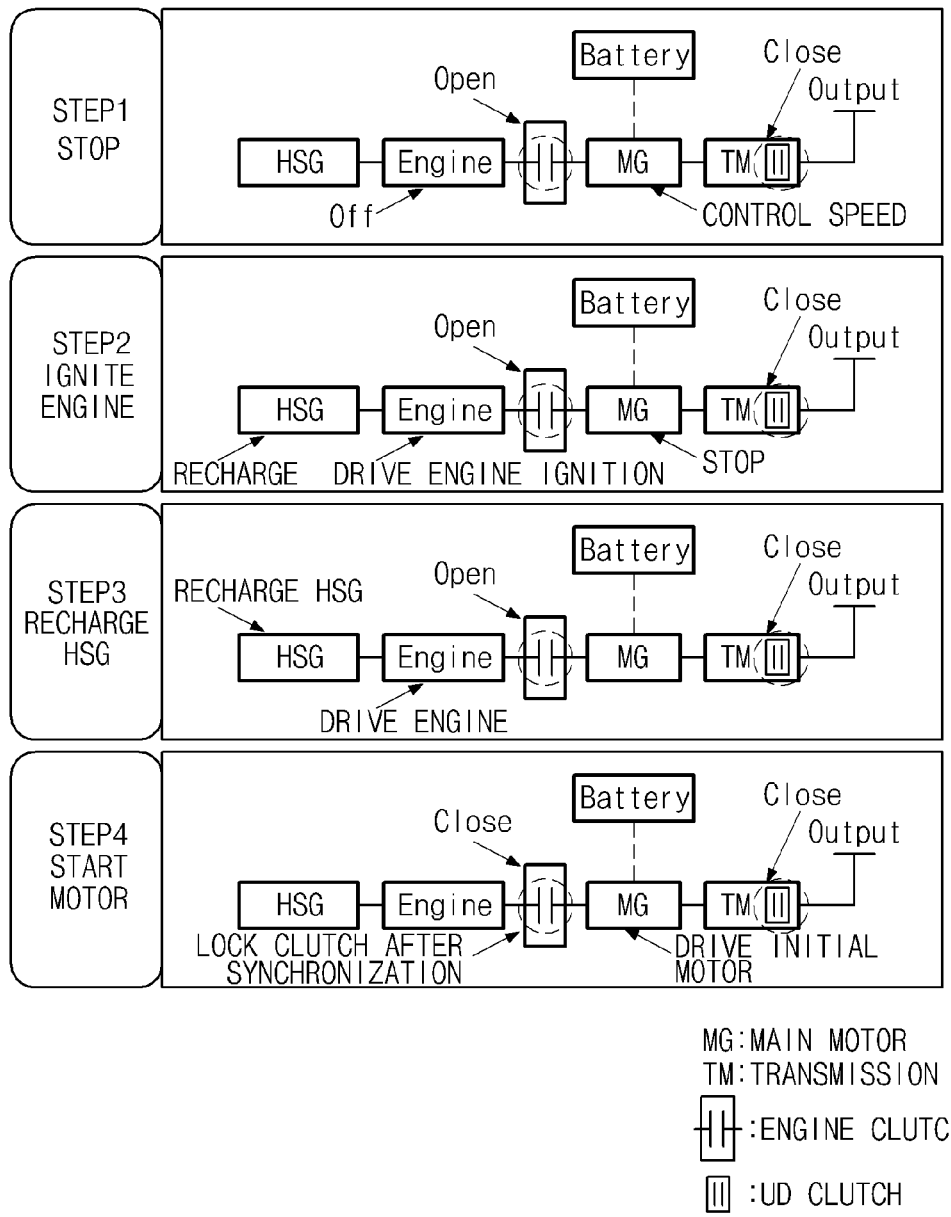
FIG. 1 is a diagram showing a battery charging method of an HEV using an HSG according to the related art.
Figure 2:
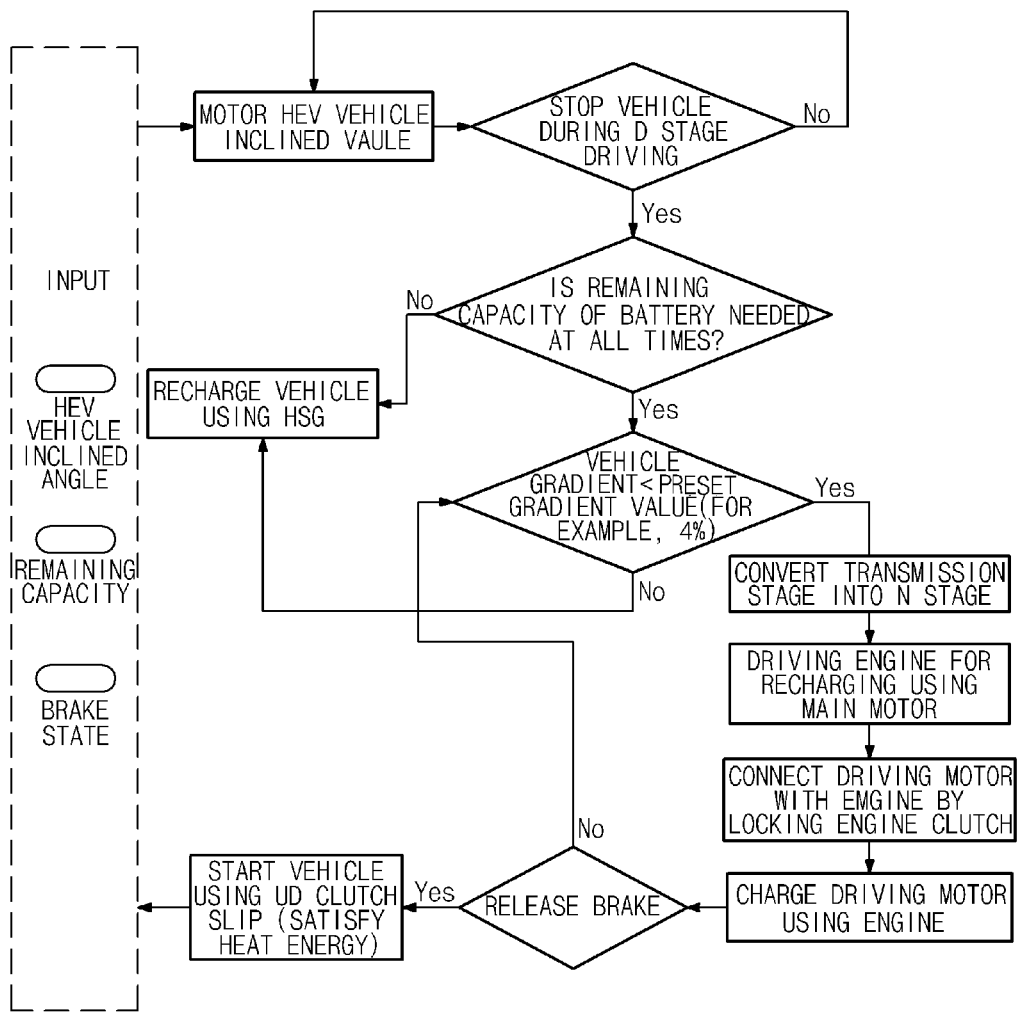
FIG. 2 is a flow chart showing a battery charging method according to an exemplary embodiment of the present invention.

Referring to FIG. 2, in the battery charging method of the exemplary embodiment of the present invention, a vehicle inclined angle of the HEV, a remaining capacity of the battery, and a brake state is monitored and the monitored results are input.

First, when the HEV stops at a D stage during the traveling, it is confirmed from the input value whether there is a need to improve the remaining capacity of the battery.

As the confirmation result, when the battery is sufficient, the charging is performed by a vehicle charging method using the HSG but, as the confirmation result, a vehicle gradient prediction value is input through the TCU (or inclination sensor) when there is a need to improve the remaining capacity of the battery due to the insufficiency of the remaining amount of the battery.

In this case, when the input gradient value is a preset gradient value (for example, 4% or more), the vehicle is charged using the HSG as in the related art. On the other hand, when the input gradient value is a set gradient value or less, a transmission stage is converted into an N stage and an engine is driven so as to recharge the battery by the main motor (see step 1 and step 2 of FIG. 3).

Figure 3:
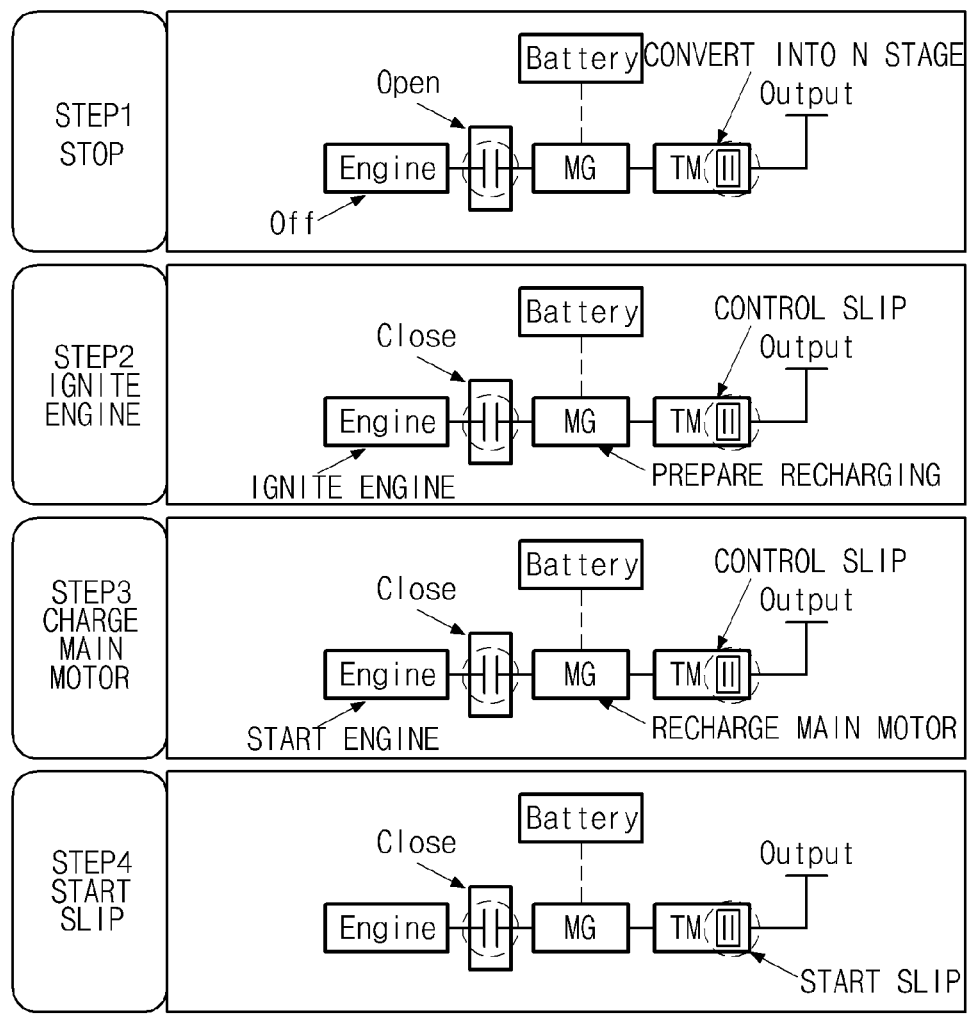
FIG. 3 is a diagram showing a battery charging method of an HEV according to the exemplary embodiment of the present invention.

After the engine is driven, the engine clutch is rapidly locked to recharge the main motor (see step 2 and step 3 of FIG. 3). The charging is continuously performed during the stopping of the vehicles by continuously stepping on the brake.

Thereafter, when the brake is released to restart the vehicle, the engine clutch is locked and thus, the motor rotates in advance together with the engine. Therefore, the vehicle goes forward by slipping an under drive (UD) clutch in the transmission to change a transmission stage from an N stage to a D stage (see step 3 and step 4 of FIG. 3).

Here, the preset gradient value is determined by comparing the energy required when the vehicle starts with allowable energy at the time of the UD clutch slip.

For example, when the vehicle starts using the UD clutch slip under a flatland condition having a gradient value of 4% or less, necessary energy is a level of 6.2 KJ and the allowable energy of the UD clutch slip is about 7.5 KJ and thus, the slip start using the UD is enabled.

Therefore, when the gradient value is 4% or less, the vehicle can start by the UD clutch slip. In this case, the engine is driven to recharge the main motor.

On the other hand, when the gradient value is 4% or more and thus, it is difficult to start the vehicle only by the UD clutch slip, as described above, the engine is operated and thus, the charging is performed using the HSG like the related art, rather than using the main motor.

Figure 4:
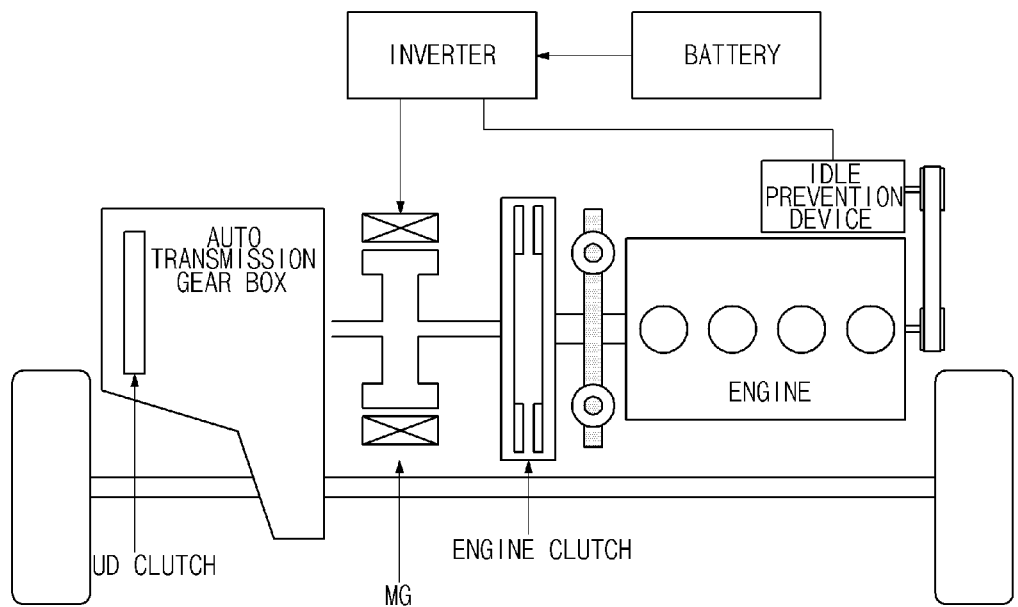
FIG. 4 is a diagram schematically showing a configuration of the HEV according to the exemplary embodiment of the present invention.

The structure does not need a time for engaging the engine clutch when the HEV starts to rapidly convert a mode. If necessary, the HSG can be removed as shown in FIG. 4 and a heating value of the engine clutch can be lowered.

As set forth above, the exemplary embodiment of the present invention can recharge the battery by using the main motor even when the hybrid vehicle stops to implement the efficiency driving and improve the fuel efficiency, more easily manage the remaining capacity of the battery for driving the main motor, and sufficiently use the main motor to improve the drivability of the hybrid electric vehicle.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A battery charging method for a hybrid electric vehicle, comprising:
   a step of receiving a vehicle gradient value through a transmission control unit (TCU) or an inclination sensor when the vehicle stops;
   a step of converting a transmission stage into a neutral stage (N stage) and driving an engine to recharge a battery by a main motor when the received vehicle gradient value is a preset gradient value or less; and
   a step of charging the battery by Generating the main motor by engaging an engine clutch after the engine is driven,
   wherein the preset gradient value is determined within a range of a gradient value in which energy required when the vehicle starts is smaller than allowable energy at the time of an underdrive clutch (UD clutch) slip by comparing energy required when the vehicle starts at the corresponding gradient value with the allowable energy at the time of the UD clutch slip.

2. The method according to claim 1, wherein the preset gradient value is determined within a range of a gradient value in which energy required when the vehicle starts is smaller than allowable energy at the time of the UD clutch slip by comparing energy required when the vehicle starts at the corresponding gradient value with the allowable energy at the time of the UD clutch slip.

3. The method according to claim 1, further comprising: at the step of charging of the main motor by engaging the engine clutch after the engine is driven, when the brake is released to restart the vehicle, changing the transmission stage from the N stage to a drive stage (D stage) by slipping an under drive clutch in a transmission such that the vehicle goes forward.

4. The method according to claim 1, wherein the steps are progressed when there is a need to improve a remaining capacity of the battery by confirming whether there is a need to improve the remaining capacity of the battery.

* * * * *